(12) United States Patent
He et al.

(10) Patent No.: US 10,104,274 B2
(45) Date of Patent: Oct. 16, 2018

(54) DOME CAMERA

(71) Applicant: HANGZHOU HIKVISION DITIGAL TECHNOLOGY CO., LTD., Zhejiang (CN)

(72) Inventors: Pinjiang He, Zhejiang (CN); Wei Wang, Zhejiang (CN); Chao Liu, Zhejiang (CN); Chenyi Shen, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 15/536,498

(22) PCT Filed: Dec. 11, 2015

(86) PCT No.: PCT/CN2015/097196
§ 371 (c)(1),
(2) Date: Jun. 15, 2017

(87) PCT Pub. No.: WO2016/115951
PCT Pub. Date: Jul. 28, 2016

(65) Prior Publication Data
US 2017/0331991 A1    Nov. 16, 2017

(30) Foreign Application Priority Data
Jan. 22, 2015 (CN) .......................... 2015 1 0034014

(51) Int. Cl.
*G03B 17/00* (2006.01)
*H04N 5/225* (2006.01)
*G03B 17/56* (2006.01)

(52) U.S. Cl.
CPC ......... *H04N 5/2254* (2013.01); *G03B 17/561* (2013.01); *G03B 17/565* (2013.01)

(58) Field of Classification Search
USPC ........................................................ 396/439
See application file for complete search history.

(56) References Cited

U.S. PATENT DOCUMENTS

| 2,410,842 A | * | 11/1946 | Scholz | ................... G03B 15/00 318/467 |
| 4,291,848 A | * | 9/1981 | Clark | ................... F41G 7/2213 244/3.16 |

(Continued)

FOREIGN PATENT DOCUMENTS

| CN | 1866121 A | 11/2006 |
| CN | 103283224 A | 9/2013 |

(Continued)

OTHER PUBLICATIONS

International Search Report from PCT/CN2015/097196; dated Dec. 11, 2015.

*Primary Examiner* — Rodney Fuller
(74) *Attorney, Agent, or Firm* — Baker & Hostetler LLP

(57) ABSTRACT

Disclosed is a dome camera, including a spherical surface part (A) positioned in the center and an edge part (B) connected thereto, wherein an internal surface (3) and an external surface (4) of the edge part (B) are revolving surfaces, and a revolution axis thereof is parallel to that of the spherical surface part (A); the internal surface (3) is in a direction away from the spherical surface part (A) from a joint with the spherical surface part (A), with a monotonically increasing revolution radius; and focal power in both a meridian direction and a sagittal direction of the edge part (B) is the same as that of the spherical surface part (A).

12 Claims, 2 Drawing Sheets

(56) References Cited

U.S. PATENT DOCUMENTS

| | | | |
|---|---|---|---|
| 2007/0217782 A1 | 9/2007 | McCutchen et al. | |
| 2011/0315808 A1* | 12/2011 | Zelinski | B82Y 20/00 244/3.16 |
| 2012/0243861 A1* | 9/2012 | Svensson | H04N 7/183 396/427 |
| 2016/0205299 A1* | 7/2016 | Imaoka | G02B 13/00 348/151 |

FOREIGN PATENT DOCUMENTS

| | | |
|---|---|---|
| CN | 204392696 U | 6/2015 |
| JP | 2008180991 A | 8/2008 |
| JP | 2014232283 A | 12/2014 |

* cited by examiner

DOME CAMERA

CROSS-REFERENCE TO RELATED PATENT APPLICATIONS

The present application is a National Stage of International Patent Application No. PCT/CN2015/097196, filed Dec. 11, 2015, and claims the priority of Chinese Patent Application No. 201510034014.X, filed on Jan. 22, 2015, the disclosures of which are incorporated herein by reference in their entirety.

TECHNICAL FIELD OF THE INVENTION

The invention relates to the field of optical imaging, and in particular to a dome camera and an optical imaging system with the same.

BACKGROUND OF THE INVENTION

A transparent dome cover is widely applied to the field of optical imaging, mainly provides mechanical protection for a camera and a lens, and has excellent optical properties, so as to minimize the adverse effects of imaging. A transparent cover for the field of security and protection is made from high-performance optical plastics usually. In order to utilize an internal space to the greatest extent, some transparent dome covers will be made in a super-hemispherical shape.

The dome camera is manufactured by using an injection process usually. In order to ensure the de-molding performance, the dome camera cannot be made to be completely spherical surface. Usually, a central area of the dome camera is processed to be spherical surface, and an edge area is processed to be conical surface. In the central area of the dome cover, in order to ensure a better optical property, both an internal surface and an external surface are concentric spherical surfaces. In the edge area of the dome cover, both an internal surface and an external surface are conical surfaces. The conical surface and spherical surface parts are connected tangentially, and the thickness remains uniform, so the characteristics of simple processing and good image quality of a central part are provided.

The inherent defects of the dome cover are that focal power in a meridian direction and a sagittal direction is different accordingly due to different curvatures of a conical surface in the two directions. After light beams pass through the dome cover, light beams in the meridian direction and the sagittal direction thereof cannot be focused on the same point, thereby making imaging fuzzy, generating remarkable astigmatism, and influencing the imaging effect. An optical system having a large focal length and a large caliber particularly has the severe defects. Due to the defect of astigmatism, an application occasion of the dome camera is greatly limited.

Another technology is that a concentric spherical surface type dome camera is manufactured by using a blow molding process. The concentric spherical surface type dome camera has consistent focal power. Due to the same curvature radius of the meridian direction and the sagittal direction, the astigmatism is avoided, and meanwhile, the problem of de-molding does not exist. However, under the limitation of characteristics of the blow molding process, the wall thickness uniformity of the dome cover is bad, the imaging quality is bad, and requirements of a high-definition imaging optical system cannot be met.

Therefore, a technical solution is expected to overcome or at least reduce one or more of the aforementioned defects of the conventional art.

SUMMARY OF THE INVENTION

Interpretation of Terms

Focal power refers to a ray convergence or divergence capability of an optical element, which is a reciprocal of a focal length thereof usually.

Astigmatism is one of optical imaging aberrations. After light beams pass through an optical element, light beams in a meridian direction and a sagittal direction thereof cannot be focused on the same point, thereby making imaging fuzzy. The aberration is called as the astigmatism.

In the invention, the meridian direction refers in particular to a direction of a generatrix of a revolution geometry.

In the invention, the sagittal direction refers in particular to a direction of a rotating circumference of the revolution geometry, and the sagittal direction is vertical to the meridian direction and a revolution axis.

An annular surface is one of optical curved surfaces, the shape being equivalent to that of a common tire surface. The important characteristic of the annular surface is that the meridian direction and the sagittal direction have different curvature radiuses.

The invention is intended to provide a dome camera for overcoming or at least reducing one or more of the aforementioned defects of the conventional art.

In order to achieve the above purpose, the invention provides a dome camera. The dome camera comprises a spherical surface part positioned in the centre and an edge part connected thereto, wherein an internal surface and an external surface of the edge part are revolving surfaces, and a revolution axis thereof is parallel to that of the spherical surface part; the internal surface is in a direction away from the spherical surface part from a joint with the spherical surface part, with a monotonically increasing revolution radius; and focal power in both a meridian direction and a sagittal direction of the edge part is the same as that of the spherical surface part. It is important to note that in the invention, implications of 'equal' comprise 'substantially equal' and 'approximate'. For example, it is regarded to be 'equal' when an absolute value of a ratio of a difference between two values to a greater value there between is less than 10%.

Preferably, the internal surface of the edge part is a conical surface, the conical surface being connected to an internal surface of the spherical surface part tangentially. The external surface of the edge part is an annular surface, the annular surface being connected to an external surface of the spherical surface part tangentially.

Preferably, the internal surface of the edge part is a conical surface, a generatrix R of the conical surface rotating outwards for a correction angle N with respect to a tangent line S of the internal surface of the spherical surface part at a joint, wherein the correction angle N is greater than 0° and less than or equal to 3°. The external surface of the edge part is an annular surface, the annular surface being connected to the external surface of the spherical surface part tangentially.

Preferably, a curvature of the annular surface in the meridian direction is equal to a difference between curvatures of the conical surface and the annular surface in the sagittal direction.

Preferably, a comprised angle P between the generatrix R of the conical surface and the revolution axis of the edge part (B) is greater than or equal to 0.1° and less than or equal to 30°. Further preferably, the comprised angle is less than or equal to 15°.

Preferably, the internal surface of the edge part is an annular surface, the annular surface being connected to the internal surface of the spherical surface part tangentially. The external surface of the edge part is a conical surface, the conical surface being connected to the external surface of the spherical surface part tangentially.

Preferably, a generatrix R of the conical surface rotates inwards for a correction angle T with respect to a tangent line of the external surface of the spherical surface part at a joint, wherein the correction angle T is greater than 0° and less than or equal to 3°.

Preferably, a curvature of the annular surface in the meridian direction is equal to a difference between curvatures of the annular surface and the conical surface in the sagittal direction.

Preferably, the internal surface of the edge part is a first annular surface, the first annular surface being connected to the internal surface of the spherical surface part tangentially. The external surface of the edge part is a second annular surface, the second annular surface being connected to the external surface of the spherical surface part tangentially.

Preferably, a difference between curvatures of the first annular surface and the second annular surface in the meridian direction is equal to a difference between curvatures of the first annular surface and the second annular surface in the sagittal direction.

Since the dome cover of the invention is arranged such that the focal power in the meridian direction and the sagittal direction of the edge part of the dome camera is the same as that of the spherical surface part, after light beams pass through the dome cover, light beams in the meridian direction and the sagittal direction of the dome cover can be focused on the same point, thereby eliminating astigmatism induced by the fact that the meridian direction and the sagittal direction cannot be focused on the same point in the conventional art, and providing favorable conditions for obtaining clear imaging.

The invention also provides an optical imaging system. The optical imaging system comprises the aforementioned dome camera.

DRAWING MARKS

Figure 1:
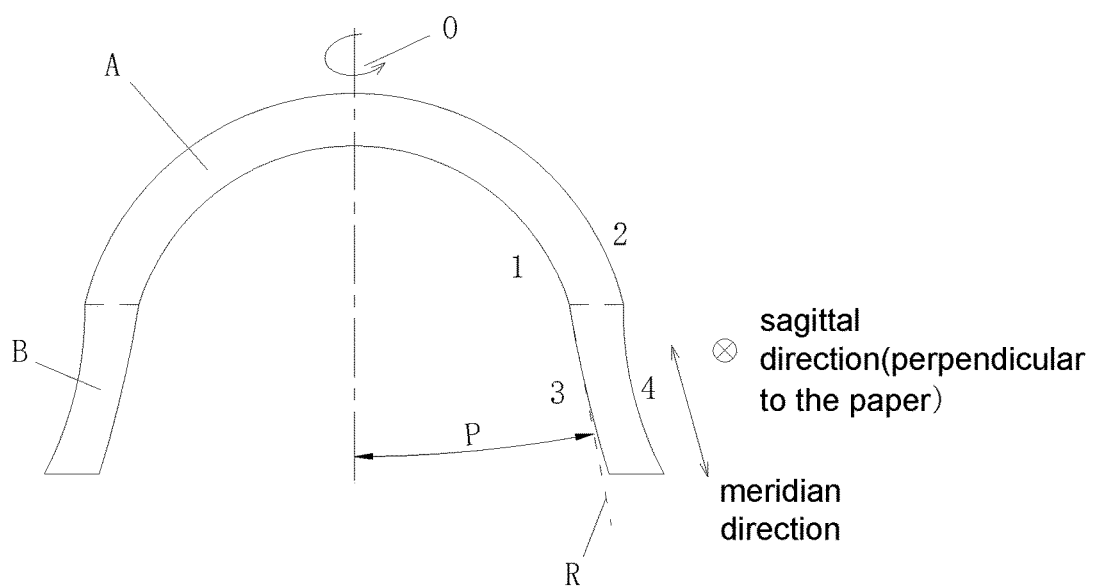
FIG. 1 is a structural diagram of a dome camera according to the invention.
Figure 2:
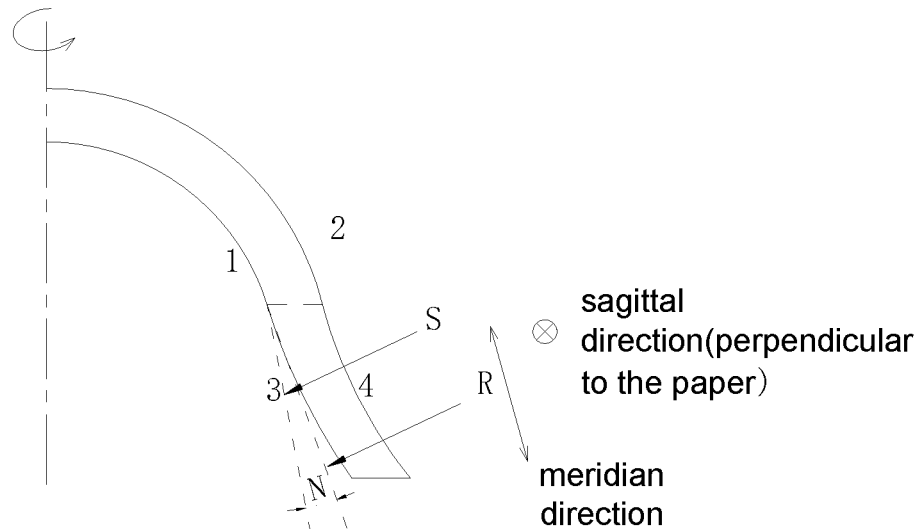
FIG. 2 is a structural diagram of a dome camera according to the embodiment 1.
Figure 3:
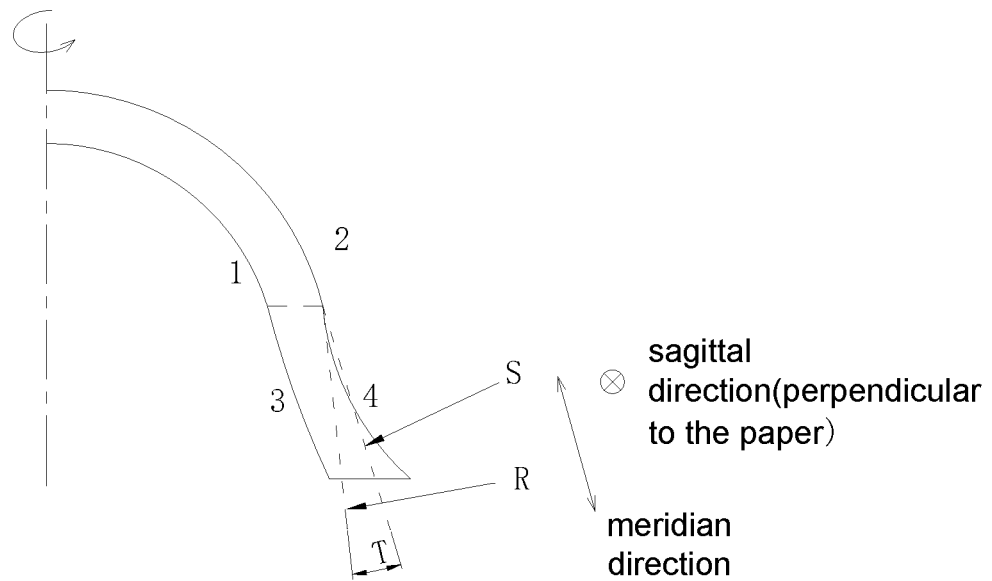
FIG. 3 is a structural diagram of a dome camera according to the embodiment 2.

| A | Spherical surface part | B | Edge part |
|---|---|---|---|
| 1 | Internal surface of spherical surface part | 2 | External surface of spherical surface part |
| 3 | Internal surface of edge part | 4 | External surface of edge part |
| 0 | Revolution axis | N | Correction angle between a generatrix of the conical surface and a tangent line of the internal surface of the spherical surface part |

-continued

| P | Angle between the generatrix of the conical surface and the revolution axis of the edge part | R | Generatrix of the conical surface |
|---|---|---|---|
| T | Tangent line of the internal surface of the spherical surface part | | |

DETAILED DESCRIPTION OF THE EMBODIMENTS

In order to make implemented purposes, technical solutions and advantages of the invention clearer, the technical solutions in the embodiments of the invention will be described in more detail hereinbelow in conjunction with the drawings in the embodiments of the invention. In the drawings, marks identical or similar all the time represent identical or similar elements or elements having identical or similar functions. The described embodiments are a part of embodiments of the invention, not all of them. The embodiments described hereinbelow by referring to the drawings are exemplar, are intended to explain the invention, and cannot be understood as limitations to the invention. On the basis of the embodiments in the invention, all other embodiments obtained on the premise of no creative work of those skilled in the art fall within the scope of protection of the invention. The embodiments of the invention will be illustrated in detail hereinbelow in conjunction with the drawings.

In the descriptions of the invention, it is important to understand that locative or positional relations indicated by 'center', 'longitudinal', 'transverse', 'front', 'back', 'left', 'right', 'vertical', 'horizontal', 'top', 'bottom', 'internal', 'external' and other terms are locative or positional relations as shown in the drawings, which are only intended to make it convenient to describe the invention and to simplify the descriptions without indicating or impliedly indicating that the referring apparatus or element must have a specific location and must be constructed and operated at a specific location, and accordingly it cannot be understood as limitations to the scope of protection of the invention.

A dome camera according to the invention comprises a spherical surface part positioned in the centre and an edge part connected thereto, wherein an internal surface and an external surface of the edge part are revolving surfaces, and a revolution axis thereof is parallel to that of the spherical surface part; the internal surface is in a direction away from the spherical surface part from a joint with the spherical surface part, with a monotonically increasing revolution radius; and focal power in both a meridian direction and a sagittal direction of the edge part is the same as that of the spherical surface part.

Since the focal power in the meridian direction and the sagittal direction of the edge part of the dome camera is the same as that of the spherical surface part in the invention, after light beams pass through the dome cover, light beams in the meridian direction and the sagittal direction of the dome cover can be focused on the same point, thereby eliminating astigmatism induced by the fact that the meridian direction and the sagittal direction cannot be focused on the same point in the conventional art, and providing favorable conditions for obtaining clear imaging.

As shown in FIG. 1, the dome camera (hereinafter referred to as dome cover) adopts a rotationally symmetrical structure form, and has a revolution axis 0. The dome cover comprises a central area and an edge area connected thereto. The central area is formed by a spherical surface part A, that is, both an internal surface 1 and an external surface 2 are spherical surfaces. Spherical centers of the internal surface 1 and the external surface 2 are coincided, that is, the two spherical surfaces are concentric. Therefore, after light beams pass through the spherical surface part A, light beams in the meridian direction and the sagittal direction of the spherical surface part A can be focused on the same point without astigmatism, and imaging is clear. The edge area is positioned at the periphery of the central area and corresponds to the edge part B. In the conventional art, focal power of the spherical surface part A and the edge part B in the meridian direction is different, and therefore light beams in the meridian direction and the sagittal direction of the dome cover cannot be focused on the same point, thereby generating astigmatism.

In view of this, the focal power of the spherical surface part A and the edge part B in the meridian direction and the sagittal direction are set to be the same or substantially the same, thereby avoiding the problem of astigmatism in the conventional art.

Specifically, the focal power of the edge part B in the meridian direction is the same as that of the spherical surface part A in the meridian direction, and the focal power of the edge part B in the sagittal direction is the same as that of the spherical surface part A in the sagittal direction.

Therefore, after light beams pass through the dome cover provided by the invention, light beams in the meridian direction and the sagittal direction of the whole dome cover having a super-hemispherical structure can be focused on the same point, thereby eliminating astigmatism induced by the fact that the meridian direction and the sagittal direction cannot be focused on the same point in the conventional art, and providing favorable conditions for obtaining clear imaging.

The aforementioned 'focal power refers to a ray convergence or divergence capability of an optical element. A calculation formula for focal power is: focal power=n'/f'= (n'−n)*C, where n and n' are refractive indexes of two sides of a surface (a refractive index of an air side being 1), C is a curvature of a surface, and f' is a focal length. That is to say, the focal power is correlated to the refractive indexes n and n' of two sides of the surface and the curvature C of the surface. Thus, two requirements may extend from control over the focal power of the edge part B.

First, the spherical surface part A and the edge part B are made from the same material, so the refractive indexes of the spherical surface part A and the edge part B may be the same.

Second, by controlling the curvatures of the spherical surface part A and the edge part B, the focal power of the edge part B in the meridian direction is the same as that of the spherical surface part A in the meridian direction, and the focal power of the edge part B in the sagittal direction is the same as that of the spherical surface part A in the sagittal direction. The focal power of the edge part B in the meridian direction is approximately equal to a superposition of focal power of the internal surface 3 and the external surface 4 of the edge part B in the meridian direction, and the focal power of the edge part B in the sagittal direction is approximately equal to a superposition of focal power of the internal surface 3 and the external surface 4 of the edge part B in the sagittal direction.

The second requirement is met on the basis of meeting the first requirement, so that the focal power of the spherical surface part A and the edge part B in the meridian direction and the sagittal direction may be the same. An implementation mode for the second requirement will be illustrated hereinbelow by means of a plurality of embodiments.

Embodiment 1

The internal surface 3 of the edge part B is a conical surface, and the conical surface is connected to the internal surface 1 of the spherical surface part A tangentially, so a certain curvature may be introduced in the sagittal direction. The external surface 4 of the edge part B is an annular surface, the annular surface is connected to the external surface 2 of the spherical surface part A tangentially, and the annular surface has different curvatures in the meridian direction and the sagittal direction, so different curvatures may be introduced in the meridian direction and the sagittal direction. By combining the internal surface 3 and the external surface 4, focal power of the combined surface is consistent with the focal power of the spherical surface part A in the meridian direction and the sagittal direction. At this time, the dome cover is equivalent to a super-hemispherical surface type dome cover in optical property. Therefore, light beams from either the spherical surface part A or the edge part B can be focused on the same point in the meridian direction and the sagittal direction all the time, thereby avoiding generation of astigmatism.

The curvature of the conical surface (internal surface 3) in the meridian direction is zero, and the curvature in the sagittal direction is a reciprocal of a revolution radius thereof. The curvature of the annular surface (external surface 4) in the sagittal direction is a reciprocal of a revolution radius thereof, and the curvature in the meridian direction is approximate to a difference between curvatures of the conical surface and the annular surface in the sagittal direction. By superposing the focal power of the conical surface and the annular surface in the meridian direction and the sagittal direction, it may be seen that the focal power of the edge part B remains substantially the same as that of the spherical surface part A, that is, the focal power of the edge part in the meridian direction and the sagittal direction is the same as that of the spherical surface part, thereby better eliminating astigmatism.

The internal surface 3 (conical surface) of the edge part B is approximately tangentially connected to the internal surface 1 of the spherical surface part A, which refers to that: a generatrix R of the conical surface rotates outwards for a correction angle N with respect to a tangent line S of the internal surface 1 of the spherical surface part A at a joint. Advantageously, the correction angle N is greater than 0° and less than or equal to 3°. For example, in an embodiment, the correction angle N is 0.2°. The aforementioned correction angle N is set for the following purposes.

During practical application, as for the technical solution of tangentially connecting the conical surface to the internal surface 1 of the spherical surface part A, it is detected that: when a principal ray in a horizontal direction passes through the internal surface 3 and the external surface 4 of the edge part B, an offset of about 0.03° will be generated. If the technical solution is applied to a long-focal-length optical imaging system, the offset will cause some adverse effects on imaging. By setting the correction angle N, the offset may be compensated. Since the internal surface 3 is the conical surface, changing the correction angle N refers to slightly correcting the conicity of the conical surface. With the change of the conicity of the internal surface 3, a deflection angle of the horizontal principal ray passing through the edge part B is changed accordingly. When the deflection angle is adjusted to a certain specifically small value, an incident principal ray and an emergent principal ray of the edge part B remain parallel. At this time, the correction angle N not only avoids influence on the focal power and astigmatism characteristics of the whole dome cover, but also can compensate the slight deflection angle of the ray, thereby achieving a good imaging effect.

It is important to note that once the aforementioned 'correction angle N' exists, the aforementioned conical surface and the internal surface 1 of the spherical surface part A cannot be completely tangentially connected, but approximately tangentially connected.

Advantageously, a comprised angle P between the generatrix R of the conical surface and the revolution axis of the edge part (B) is greater than or equal to 0.1° and less than or equal to 30°, thereby facilitating de-molding. De-molding is more easily implemented during processing with a larger angle. However, the caliber of the edge part will be increased too fast if the angle is too large, so the total size of the dome cover is over-large. Therefore, preferably, the comprised angle P between the generatrix R of the conical surface and the revolution axis of the edge part (B) is less than or equal to 15°.

Embodiment 2

The internal surface 3 of the edge part B is an annular surface, the annular surface is connected to the internal surface 1 of the spherical surface part A tangentially, and the annular surface has different curvatures in the meridian direction and the sagittal direction, so different curvatures may be introduced in the meridian direction and the sagittal direction. The external surface 4 of the edge part B is a conical surface, and the conical surface is tangentially connected or approximately tangentially connected to the external surface 2 of the spherical surface part A, so a certain curvature may be introduced in the sagittal direction. By combining the internal surface 3 and the external surface 4, focal power of the combined surface is consistent with the focal power of the spherical surface part A in the meridian direction and the sagittal direction. At this time, the dome cover is equivalent to a super-hemispherical surface type dome cover in optical property. Therefore, light beams from either the spherical surface part A or the edge part B can be focused on the same point in the meridian direction and the sagittal direction all the time, thereby avoiding generation of astigmatism.

The curvature of the annular surface (internal surface 3) in the meridian direction is approximate to a difference between curvatures of the conical surface and the annular surface in the sagittal direction, and the curvature in the sagittal direction is a reciprocal of a revolution radius thereof. The curvature of the conical surface (external surface 4) in the sagittal direction is zero, and the curvature in the sagittal direction is a reciprocal of a revolution radius thereof. By superposing the focal power of the conical surface and the annular surface in the meridian direction and the sagittal direction, it may be seen that the focal power of the edge part B remains substantially the same as that of the spherical surface part A, thereby eliminating astigmatism.

The external surface 4 (conical surface) of the edge part B is approximately tangentially connected to the external surface 2 of the spherical surface part A, which refers to that: a generatrix R of the conical surface rotates inwards for a correction angle T with respect to a tangent line of the external surface 2 of the spherical surface part A at a joint. Preferably, the correction angle T is greater than 0° and less than or equal to 3°. Advantageously, the correction angle T is greater than 0° and less than or equal to 3°. For example, in an embodiment, the correction angle T is 0.2°. The aforementioned correction angle T is set for the following purposes.

During practical application, as for the technical solution of tangentially connecting the conical surface to the external surface 2 of the spherical surface part A, when a principal ray in a horizontal direction passes through the internal surface 3 and the external surface 4 of the edge part B, an offset of about 0.03° will be generated. If the technical solution is applied to a long-focal-length optical imaging system, the offset will cause some adverse effects on imaging. By setting the correction angle T, the offset may be compensated. With the change of the correction angle T, a deflection angle of the ray passing through the edge part B is changed accordingly. When the deflection angle is adjusted to a certain specifically small value, an incident principal ray and an emergent principal ray of the edge part B remain parallel. At this time, the correction angle T not only avoids influence on the focal power and astigmatism characteristics of the whole dome cover, but also can compensate the slight deflection angle of the ray, thereby achieving a good imaging effect.

It is important to note that once the aforementioned 'correction angle T' exists, the aforementioned conical surface and the internal surface 1 of the spherical surface part A cannot be completely tangentially connected, but approximately tangentially connected.

Embodiment 3

The internal surface 3 of the edge part B is a first annular surface, the first annular surface is connected to the internal surface 1 of the spherical surface part A tangentially, and the first annular surface has different curvatures in the meridian direction and the sagittal direction, so different curvatures may be introduced in the meridian direction and the sagittal direction. The external surface 4 of the edge part B is a second annular surface, and the second annular surface is connected to the external surface 2 of the spherical surface part A tangentially, so different curvatures may also be introduced in the meridian direction and the sagittal direction. By combining the internal surface 3 and the external surface 4, focal power of the combined surface is consistent with the focal power of the spherical surface part A in the meridian direction and the sagittal direction. At this time, the dome cover is equivalent to a super-hemispherical surface type dome cover in optical property. Therefore, light beams from either the spherical surface part A or the edge part B can be focused on the same point in the meridian direction and the sagittal direction all the time, thereby avoiding generation of astigmatism.

The curvature of the first annular surface (internal surface 3) in the sagittal direction is a reciprocal of a revolution radius thereof, and the curvature of the second annular surface (external surface 4) in the sagittal direction is a reciprocal of a revolution radius thereof. A difference between curvatures of the first annular surface and the second annular surface in the meridian direction is approximate to a difference between curvatures of the first annular surface and the second annular surface in the sagittal direction. By superposing the focal power of the first annular surface and the second annular surface in the meridian direction and the sagittal direction, it may be seen that the focal power of the edge part B remains substantially the same as that of the spherical surface part A, thereby eliminating astigmatism.

Essentially, the internal surface 3 and the external surface 4 of the edge part B may also be curved surfaces in other shapes. For example, the generatrix of the internal surface is composed of a first straight line segment and a first circular arc line, and the generatrix of the external surface is composed of a second circular arc line and a second straight line segment. For another example, the generatrix of the internal surface is composed of a plurality of circular arc lines having different radiuses, and the generatrix of the external surface is composed of a plurality of circular arc lines having different radiuses. No listing is performed herein as long as it is ensured that the total focal power of the internal surface 3 and the external surface 4 is the same as that of the spherical surface part A in the meridian direction and the sagittal direction.

The aforementioned 'principal ray' refers to passing through the spherical center of the dome cover, and the direction of the ray is horizontal.

The aforementioned 'approximate' refers to approximate or basic equality.

The invention also provides an optical imaging system, which at least comprises the dome cover in each of the aforementioned embodiments. Other parts in the optical imaging system are parts in the conventional art, which will not be further described herein.

Finally, it is important to note that the above embodiment is only the technical solutions for illustrating the invention and not intended to limit the invention. Although the invention is illustrated in detail with reference to the aforementioned embodiments, those of ordinary skill in the art shall understand that the technical solutions recorded in each of the aforementioned embodiments may be still modified or some technical features therein are equivalently replaced. These modifications or replacements will not make the essence of the corresponding technical solutions depart from the spirit and scope of the technical solutions in each embodiment of the invention.

The invention claimed is:

1. A dome camera, comprising a spherical surface part (A) positioned in the centre and an edge part (B) connected to the spherical surface part (A), wherein an internal surface (3) and an external surface (4) of the edge part (B) are revolving surfaces, and a revolution axis of the edge part (B) is parallel to that of the spherical surface part (A); the internal surface (3) is in a direction away from the spherical surface part (A) from a joint with the spherical surface part (A), with a monotonically increasing revolution radius; and focal power in both a meridian direction and a sagittal direction of the edge part (B) is the same as that of the spherical surface part (A).

2. The dome camera according to claim 1, wherein the internal surface (3) of the edge part (B) is a conical surface, the conical surface being connected to an internal surface (1) of the spherical surface part (A) tangentially; and the external surface (4) of the edge part (B) is an annular surface, the annular surface being connected to an external surface (2) of the spherical surface part (A) tangentially.

3. The dome camera according to claim 2, wherein a curvature of the annular surface in the meridian direction is equal to a difference between curvatures of the conical surface and the annular surface in the sagittal direction.

4. The dome camera according to claim 2, wherein a comprised angle P between the generatrix R of the conical surface and the revolution axis of the edge part (B) is greater than or equal to 0.1° and less than or equal to 30°.

5. The dome camera according to claim 1, wherein the internal surface (3) of the edge part (B) is a conical surface, a generatix R of the conical surface rotating outwards for a correction angle N with respect to a tangent line S of the internal surface (1) of the spherical surface part (A) at a joint, wherein the correction angle N is greater than 0° and less than or equal to 3°; and the external surface (4) of the edge part (B) is an annular surface, the annular surface being connected to the external surface (2) of the spherical surface part (A) tangentially.

6. The dome camera according to claim 5, wherein a curvature of the annular surface in the meridian direction is equal to a difference between curvatures of the conical surface and the annular surface in the sagittal direction.

7. The dome camera according to claim 5, wherein a comprised angle P between the generatrix R of the conical surface and the revolution axis of the edge part (B) is greater than or equal to 0.1° and less than or equal to 30°.

8. The dome camera according to claim 1, wherein the internal surface (3) of the edge part (B) is an annular surface, the annular surface being connected to the internal surface (1) of the spherical surface part (A) tangentially; and the external surface (4) of the edge part (B) is a conical surface, the conical surface being connected to the external surface (2) of the spherical surface part (A) tangentially.

9. The dome camera according to claim 8, wherein a generatrix R of the conical surface rotates inwards for a correction angle T with respect to a tangent line of the external surface (2) of the spherical surface part (A) at a joint, wherein the correction angle T is greater than 0° and less than or equal to 3°.

10. The dome camera according to claim 9, wherein a curvature of the annular surface in the meridian direction is equal to a difference between curvatures of the annular surface and the conical surface in the sagittal direction.

11. The dome camera according to claim 1, wherein the internal surface (3) of the edge part (B) is a first annular surface, the first annular surface being connected to the internal surface (1) of the spherical surface part (A) tangentially; and the external surface (4) of the edge part (B) is a second annular surface, the second annular surface being connected to the external surface (2) of the spherical surface part (A) tangentially.

12. The dome camera according to claim 11, wherein a difference between curvatures of the first annular surface and the second annular surface in the meridian direction is equal to a difference between curvatures of the first annular surface and the second annular surface in the sagittal direction.

* * * * *